Figures 1, 2:
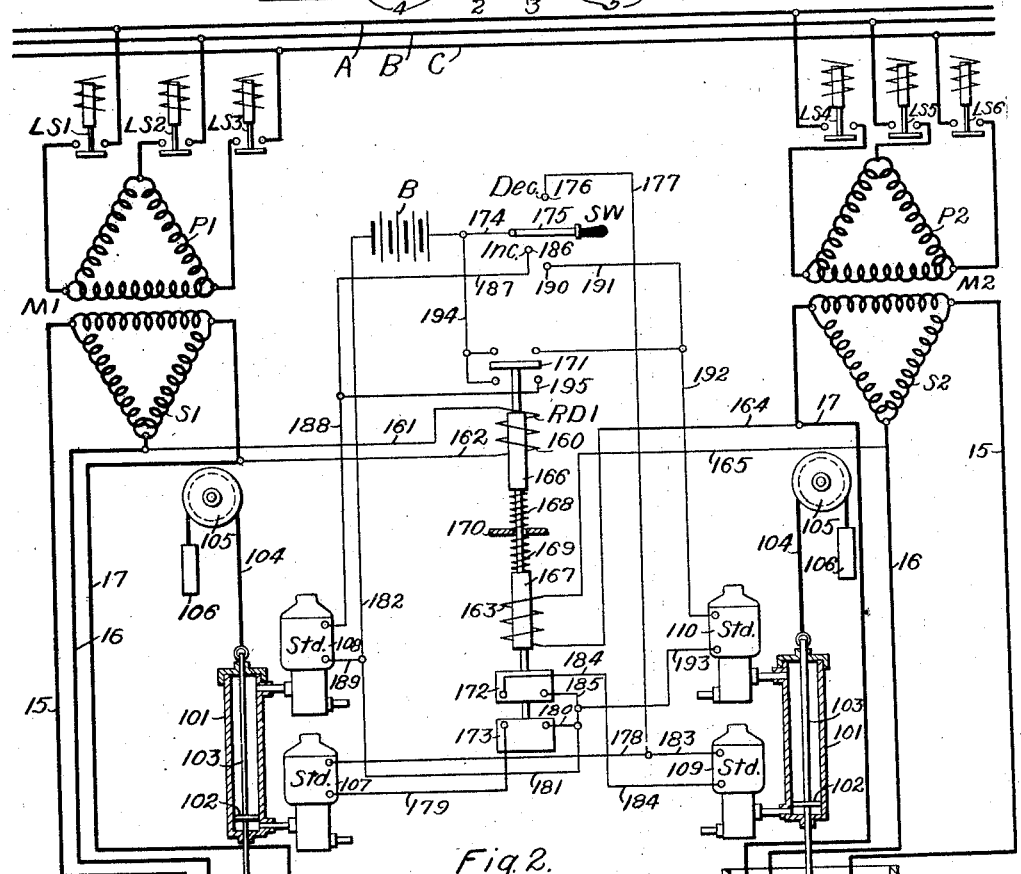

Nov. 27, 1923.

R. E. HELLMUND

SYSTEM OF CONTROL

Original Filed Jan. 5, 1916

1,475,823

WITNESSES:
J. A. Helsel
W. R. Coley

INVENTOR
Rudolf E. Hellmund.
BY
Wesley G. Carr
ATTORNEY

Patented Nov. 27, 1923.

1,475,823

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

Original application filed January 5, 1916, Serial No. 70,437. Divided and this application filed March 13, 1920. Serial No. 365,396.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification, this application being a division of my copending application, Serial No. 70,437, filed January 5, 1916, which matured into Patent #1,349,376, granted August 10, 1920.

My invention relates to electrically-propelled vehicles and to systems of control therefor and especially to vehicles that are driven by a plurality of induction motors.

One object of my invention is to provide, in connection with a system of the above-indicated character, means which shall be relatively simple and inexpensive in construction and effective and reliable in operation for automatically performing predetermined functions to restore normal conditions when any set of driving wheels "slips," that is, rapidly rotates without gripping the rails.

More specifically stated, it is the object of my invention to provide, in a system of the class under consideration, means whereby, under predetermined slippage conditions of any motor, the rotor-circuit resistance thereof may be automatically increased, thus tending to maintain normal speed conditions.

In the prior art, when the acceleration of a plurality of driving induction motors has been either partially or wholly dependent upon the action of a limit switch that is actuated in accordance with the primary current of the induction motor or motors, difficulties have been experienced whenever the vehicle wheels that are associated with any of the motors have started to slip. Under such circumstances, the primary current of the slipping motor decreases to a relatively low value, whereby the limit switch remains in its lower position to effect the gradual short-circuiting of the corresponding rotor or secondary-circuit resistance, in accordance with the usual function of the limit switch; whereas, in order to eliminate the slippage, the rotor-circuit resistance of the corresponding induction motor should be increased until the speed of the motor has decreased to its normal value, in accordance with familiar principles.

According to my present invention, I provide electrical relay means that are electrically connected with the rotors of the several driving induction motors and are adapted to counter-balance each other under normal and substantially equal-speed conditions of the motors, but which are adapted to produce an unbalanced effect under predetermined unequal rotor-speed conditions, such as occur upon the slippage of one motor and the corresponding wheels, and I associate with the relay means certain switching means for automatically increasing the rotor-circuit resistance of the slipping motor or performing other restorative functions, as hereinafter more fully set forth.

In the accompanying drawings, Fig. 1 is a diagrammatic view of an electric locomotive unit embodying a plurality of driving motors to which my invention may be applied; and Fig. 2 is a diagrammatic view of the essential circuits of a system of control embodying my invention.

Referring to Fig. 1, the structure shown comprises a locomotive cab 1 which is suitably supported upon a plurality of articulated trucks 2 and 3 of suitable design and which respectively embody a plurality of driving wheels 4 and 5, that are adapted to run upon rails 6, in accordance with usual practice. A plurality of driving induction motors M1 and M2 are provided and may be associated with the wheels of the various trucks in any suitable manner, as by driving mechanisms 7 and 8 of a familiar type.

Referring now to Fig. 2, the system shown comprises a plurality of suitable three-phase supply-circuit conductors A, B and C; the driving induction motors M1 and M2 that may respectively comprise delta-connected primary windings P1 and P2 and co-operating delta-connected secondary or rotor windings S1 and S2; a plurality of suitable variable accelerating resistors LR1 and LR2 for the rotor windings S1 and S2 respectively; a plurality of main-circuit switches LS1, LS2 and LS3 for connecting the primary winding P1 to the supply-circuit conductors; a plurality of similar switches LS4, LS5 and LS6 for performing a similar function with respect to the primary winding P2; an auxiliary source of energy, such as a battery B; a starting switch SW; and a solenoid-type relay device RD1 that is associated with the secondary windings S1 and S2, in a manner to be described.

The variable resistors LR1 and LR2 are here shown as comprising resistors of the familiar liquid-rheostat type and severally embody suitable electrolyte-containing tanks or chambers 11, within which are disposed a plurality of suitable immersible plates or electrodes 12, as is customary; and lower compartments 13 from which the electrolyte may be pumped into the tanks 11 and to which the electrolyte may be returned in accordance with the action of suitable regulating and discharge valves 14 that are more fully described in a patent issued to Arthur J. Hall on April 15, 1919, No. 1,300,383, and assigned to the Westinghouse Electric & Manufacturing Company. Inasmuch as the particular type of rheostat and the structural details thereof are immaterial to my present invention, I do not deem it necessary to describe the same any further.

The electrodes or plates 12 of the rheostat LR1 are respectively connected to the terminals of the secondary winding S1 by conductors 15, 16 and 17, and the electrodes of the other rheostat LR2 are similarly connected to the secondary winding S2.

The operating mechanism for each of the valves 14, whereby electrolyte is admitted to the tank 11 to gradually decrease the rotor-circuit resistance or is discharged from the tank 11 to the compartment 13 to increase such resistance, comprises a suitable operating cylinder 101 within which is disposed a piston member 102 that is associated with the rod 20 of the valve 14, while a second rod 103 is secured to the opposite side of the piston 102 and is of a sufficient length to extend through one end of the cylinder 101 when the piston 102 is located at the other end thereof. The rod 103 is connected to a cord or cable 104 that passes over a pulley 105 and has a suitable counterbalancing weight 106 attached to its outer end. A pair of standard or normally closed magnet valves 107 and 108 are associated with the respective ends of the cylinder 101 for admitting fluid pressure to the one or the other side of the piston 102 in accordance with the energization of the respective valve magnets. The other liquid rheostat LR2 is provided with a similar pair of operating valve magnets 109 and 110.

The relay device RD1 comprises an actuating coil 160 that is connected through conductors 161 and 162 to two of the terminals of the secondary winding S1; a second actuating coil 163 that is connected through conductors 164 and 165 across one phase of the secondary winding S2; a magnetizable core member 166 that is adapted to be actuated upwardly by the coil 160 and a second alined and mechanically associated core member 167 that is adapted to be actuated downwardly by the coil 163; and a plurality of suitable springs 168 and 169 that are respectively disposed between the core members 166 and 167 and a stationary member 170; whereby the relay device RD1 is biased to an intermediate position wherein a bridging contact member 171 that is associated with the upper end of the relay device occupies an open position, while a pair of contact members 172 and 173 that are associated with the lower end of the relay device assume a closed or operative position.

Assuming that it is desired to effect acceleration of the driving motors, the switch SW may be actuated to its upper position marked "Dec.," standing for decrease of resistance, whereupon a circuit is completed from one terminal of the battery B through conductor 174, the blade 175 of the switch SW, stationary contact member 176, conductors 177 and 178, actuating coil 107 of the liquid rheostat LR1, conductor 179, movable contact member 173 of the relay device RD1 and conductors 181 and 182 to the opposite battery terminal. A parallel circuit is established from conductor 177 through conductor 183, the actuating coil 109 of the liquid rheostat LR2, conductor 184, movable contact member 172 of the relay device RD1 and conductor 185 to the negative conductor 181. The resistances of the circuits of the secondary windings S1 and S2 are thus gradually decreased, as the liquid level rises, in accordance with the movement of the valve 14.

To effect the discharge of electrolyte from the tanks 11, the switch SW may be actuated to its position marked "Inc.," standing for increase of resistance, whereupon one circuit is completed from the blade 175 of the switch SW through stationary contact member 186, conductors 187 and 188, actuating coil 108 of the liquid rheostat LR1 and conductor 189 to the negative conductor 182. Another circuit is simultaneously established from the blade 175 of the switch SW through stationary contact member 190, conductors 191 and 192, actuating coil 110 of the liquid rheostat LR2 and conductor 193 to the negative conductor 181, thereby effecting the discharge of the electrolyte from the tanks 11 as the valves 14 are returned to their normal positions.

Assuming that the rotor S1 and the corresponding wheels "slip," the voltage of the secondary winding S1 decreases, thereby weakening the pull of the actuating coil 160 of the relay device RD1 and thus permitting the actuation of the relay device by the other coil 163 to the lower position, wherein a circuit is established from one terminal of the battery B through conductor 194, bridging contact member 171 of the relay device, and conductor 195 to conductor 188 and the actuating coil 108 of the liquid rheostat 101. The other actuating coil 107 is simultaneously de-energized by the disconnection of the movable contact member 173 of the relay device from conductors 179 and 180. Thus, the resistance of the circuit of the rotor winding S1 is increased until slippage conditions are eliminated.

On the other hand, if the motor M2 and the corresponding wheels "slip", the actuating coil 163 of the relay device is weakened in its effect, whereby the other coil 160 actuates the device to the upper position shown in the drawing, and a circuit is thus completed from the conductor 194 through bridging contact member 171 of the relay device and conductor 196 to conductor 192 and the actuating coil 110 of the liquid rheostat LR2 to increase the resistance of the circuit of the secondary winding S2 until normal-speed conditions are obtained. The upward movement of the relay device effects the disengagement of the contact member 172 and the corresponding contact fingers, whereby the other actuating coil 109 of the liquid rheostat LR2 is de-energized to permit of the desired actuation of the piston 102.

It will thus be seen that I have provided simple and reliable means for automatically restoring normal conditions in case of the slippage of any driving motor and corresponding set of wheels.

I do not wish to be restricted to the specific circuit connections or arrangement and location of parts herein set forth, as various modifications thereof may be effected within the spirit and scope of my invention. I desire, therefore, that only such limitations shall be imposed as are indicated in the appended claims.

I claim as my invention

1. In an electrically-propelled vehicle, the combination with a plurality of driving induction motors suitably associated with the vehicle wheels, of a plurality of alined oppositely-acting solenoids connected with the respective main rotors, and means dependent upon an unbalancing of the solenoid effects to vary the rotor-circuit resistance of the corresponding motor.

2. In an electrically-propelled vehicle, the combination with a plurality of driving induction motors suitably associated with the vehicle wheels, of a plurality of alined oppositely-acting solenoids connected with the respective main rotors, and having mechanically-connected core members biased to a central position, whereby movement of said core members in the one or the other direction from said central position occurs only under slippage conditions of the corresponding vehicle wheels and main rotor, a plurality of variable resistors respectively associated with the main rotors, operating mechanisms for varying the respective resistors, and means dependent upon said core-member movement for effecting the actuation of the one or the other operating mechanism to eliminate said slippage.

3. In an electrically-propelled vehicle, the combination with a plurality of driving induction motors suitably associated with the vehicle wheels, of a plurality of alined oppositely-acting solenoids connected with the respective main rotors and having mechanically-connected core members biased to a central position, whereby movement of said core members in the one or the other direction from said central position occurs only under slippage conditions of the corresponding vehicle wheels and main rotor, a plurality of variable resistors respectively associated with the main rotors, fluid-pressure operating mechanisms for varying the respective resistors, electrically-controlled valves for governing the actuation of said mechanisms in the one or the other direction, and switching means dependent upon said core-member movement for effecting the electrical energization of said valves in such manner as to increase the rotor-circuit resistance of the proper motor to eliminate said slippage.

4. The combination with a plurality of dynamo-electric machines, of a plurality of oppositely acting solenoids connected with the respective machine rotors and having mechanically-connected core members biased to a central position, whereby movement of said core members in the one or the other direction occurs under slippage conditions of the corresponding rotor, a plurality of variable resistors associated with the respective rotors, and means responsive to said core-member movement for effecting an increase in the circuit resistance of the slipping rotor.

5. The combination with a plurality of dynamo-electric machines, of a plurality of oppositely-acting solenoids connected with the respective rotors and having mechanically-connected core members biased to a central position, whereby movement of said core members in the one or the other direction from said central position occurs only under slippage conditions of the corresponding rotor, a plurality of variable resistors respectively associated with the rotors, fluid-pressure operating mechanisms for varying the respective resistors, electrically-controlled valves for governing the actuation of said mechanisms in the one or the other direction, and switching means dependent upon said core-member movement for effecting the electrical energization of said valves in such manner as to increase the rotor-circuit resistance of the proper machine to eliminate said slippage.

In testimony whereof, I have hereunto subscribed my name this 20th day of February 1920.

RUDOLF E. HELLMUND.